INVENTORS
SELIG LENEFSKY
JOHN J. MORRONE
DONAL R. TREFFEISEN
BY
ATTORNEY

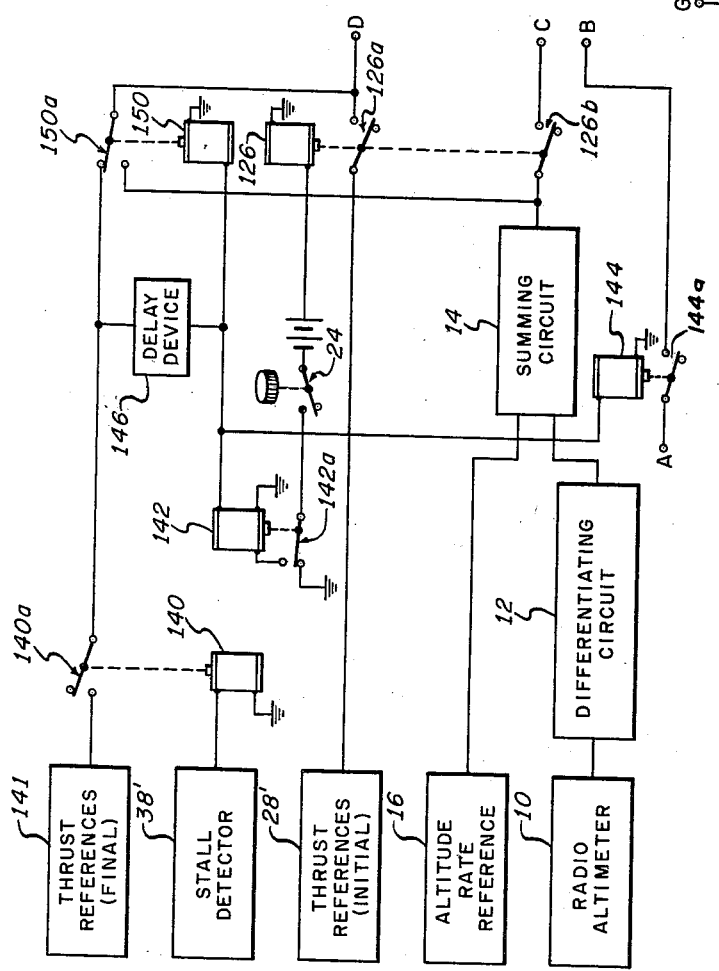
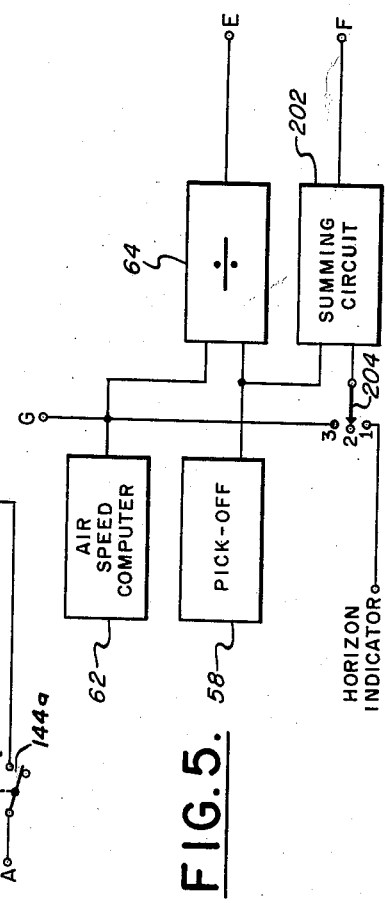

United States Patent Office 3,105,660
Patented Oct. 1, 1963

3,105,660
AUTOMATIC FLIGHT CONTROL SYSTEM
Selig Lenefsky, New Hyde Park, John J. Morrone, Elmhurst, and Donal R. Treffeisen, Huntington Station, N.Y., assignors to Sperry Rand Corporation, a corporation of Delaware
Filed Oct. 4, 1960, Ser. No. 60,412
13 Claims. (Cl. 244—77)

This invention relates generally to flight control systems and more particularly to apparatus for controlling the flight of a vertical take-off and landing, i.e. VTOL, aircraft during a landing maneuver.

The landing of a VTOL aircraft is a unique operation because aerodynamic forces which support the craft above the earth during normal flight must be gradually replaced by the thrust of the craft engine as the landing area is approached. Generally, this exchange of support forces is achieved by decreasing the ground speed of the VTOL craft to zero and, at the same time, precessing the resultant thrust of the craft so that it has a perpendicular relationship with the earth. When the VTOL craft being landed is a tailsitter, i.e. the type that takes off and lands with its longitudinal axis perpendicular to the earth, the ground speed reduction and thrust precession may be attained by gradually increasing the craft flight path angle to ninety degrees while, at the same time, increasing the thrust until a thrust-to-weight ratio of one is attained. This causes the craft to zoom to a considerable height above the earth. The craft is then backed down to the earth by carefully manipulating the craft throttle. The backing-down operation is an extremely fatiguing one for the pilot because of the care with which he must control the throttle. In addition, the backing-down operation is extremely inefficient because the craft thrust must be held approximately equal to the craft weight to effect a safe descent rate. This results in high fuel consumption.

Apparatus embodying the present invention minimizes pilot fatigue and improves the efficiency of landing a tailsitter VTOL craft by eliminating the need for a zooming maneuver, thereby lowering the altitude at which the backing-down maneuver must be started. Generally, the zooming maneuver is eliminated as follows: with the craft in normal level flight, i.e. flying as a conventional airplane, and approaching a landing area, the craft thrust is reduced to a predetermined low level. At the same time, the craft pitch is gradually increased to maintain the craft altitude constant; this causes the craft angle of attack to be increased also. Just prior to reaching the stall angle of attack, the craft throttle is advanced until a thrust-to-weight ratio of approximately one is reached. The throttle is advanced before reaching the stall angle of attack so that the thrust increase (which lags the advance of the throttle) produced thereby will exactly coincide in time with the loss of aerodynamic lift experienced at the stall angle of attack. At the same time the throttle is being advanced, the craft thrust is deflected from a substantially parallel relationship with the craft longitudinal axis to keep the craft pitching up until a pitch attitude of approximately ninety degrees is reached. Thrust deflecting techniques presently employed by VTOL aircraft utilize: pivotably mounted engines; vanes which are insertable into the exhaust stream from the craft engine; and auxiliary engines, different combinations of which effect different directions of resultant thrust. Whereas the prior art technique for landing a tailsitter VTOL craft requires the craft throttle to be continually advanced to zoom the craft to a considerable distance over the earth, apparatus embodying the invention enables the craft to be positioned a short distance over the earth through a "retard-then advance" manipulation of the craft throttle. Such throttle control provides economical fuel consumption by shortening the backing-down maneuver required, as earlier discussed, and by causing the craft to fly through a considerable portion (the initial phase) of the landing maneuver at a low thrust level.

Throughout the above-described phase of the landing maneuver the craft attitude relative to the earth must be changed constantly; therefore, each of the craft control surfaces must be constantly varied relative to some neutral position (as defined by a reference device) to effect these attitude changes. Most prior art reference devices are slaved to the earth and as such establish references which have fixed orientations relative to the earth. When an aircraft employs one of these reference devices, e.g. a gyro horizon, and acquires a pitch attitude of 90 degrees, the roll axis pick-off and yaw axis pick-off of the device both produce meaningless output signals. This is because the gyro is in gimbal lock. Even with single degree of freedom gyros, the coordinate transformation that takes place at a pitch angle of 90° causes a change of control sensing. A roll axis pick-off produces a signal representing the yaw of the craft and a yaw axis pick-off produces a signal representing the roll of the craft. Since the tailsitter VTOL aircraft often has a pitch attitude of 90 degrees, apparatus embodying the invention does not employ a fixed reference, but, instead, varies the attitude of the reference relative to the earth. The craft control surfaces are then varied relative to varying neutral positions as defined by the varying reference. In this way, the craft pitch angle relative to the reference is maintained considerably below 90 degrees, thereby avoiding the problem encountered with fixed reference systems. To provide a reference having a variable attitude, the present invention employs a two-degree of freedom gyro whose precessable spin axis defines the reference and the instantaneous commanded attitude of the craft longitudinal axis. That is, the gyro spin axis is first directed as desired and the craft is made to follow-up on this moving reference, thereby keeping the pitch command signals (and the angles that they represent) small. Since yaw and roll control of the craft constitute no part of the invention, they are not discussed in this specification.

With the craft hovering and ready to descend to the earth, changes in the craft lateral position over the earth are made generally as follows: the craft resultant thrust vector is simultaneously tipped and increased to produce two components of thrust, one component being in the direction that the pilot desires to move the craft and the other component being equal to the craft weight and directed perpendicular to the earth. The resultant thrust vector of the craft is tipped through the operation of the craft thrust deflector which, as presently practiced in the art, is varied by an amount proportional to the force applied to the craft control stick. By varying the craft thrust deflector, forces are produced which tend to tip and angularly accelerate the craft about its pitch axis. In order for the pilot to control the lateral positioning of his craft over the earth, it is necessary for him first to perform mentally a double integration of this angular acceleration to determine the proper angular orientation of the craft about its pitch axis. Then, with this angular orientation determined and producing a thrust component in the direction desired, the pilot must once again doubly integrate mentally the later acceleration produced by this thrust component to bring the craft to the desired lateral position. As a result of these mental integrations, the pilot derives a signal representing the time integral of the craft lateral velocity, i.e. the lateral distance that the craft has moved, and adjusts the force applied to his control stick in proportion to this signal. For example, with the craft moving at a given velocity toward a desired position, the pilot must derive mentally the distance covered relative to that position and move his control stick to slow the craft down as the position is approached. This is so that the completed integration of the craft velocity with respect to time will leave the craft in the exact position desired. Mentally performing simultaneously two double integrations is an extremely difficult job for the pilot and, therefore, it is very difficult for him to derive a signal (representing lateral distance covered) which can be used to cancel the signal representing the force applied to the control stick. Therefore, in practice, the pilot in order to change his lateral position momentarily moves his control stick and immediately retracts it to its neutral position. This causes the craft to inch toward the desired lateral position. This is repeated time after time until the craft reaches the desired position. This control problem is made more difficult because of the excessive lag between control action and desired response. In general, such a control system would be unstable when in the hands of the pilot.

Apparatus embodying the invention simplifies the job of the pilot by eliminating some of the integrations which the pilot heretofore had to perform mentally. In one specie of the invention, a signal representing the result of integrating the craft angular velocity in pitch, i.e. angular position or lateral acceleration, is automatically provided and compared with a signal representing the force applied to the control stick to produce an error signal. The error signal is then used to vary the craft thrust deflector until a signal representing an angular orientation of the craft about its pitch axis and exactly cancelling the control stick force signal has been produced. Therefore, the pilot commands an angular orientation of the craft about its pitch axis when he moves his control stick and has only to perform mentally a double integration of a signal representing the craft lateral acceleration to derive a signal representing the distance that the craft has moved. This derived signal, in the form of a force, is then subtracted from the force applied to the control stick. This entire operation can be done with comparative ease since the pilot is required to perform only one double integration, thereby obviating the need to inch the craft over to a new position as earlier mentioned.

Another specie of the invention automatically provides and compares a signal representing the craft lateral velocity with a signal representing the force applied to the craft control stick to produce an error signal. The error signal is then used to vary the craft thrust deflector until a signal representing the craft velocity is produced which cancels the control stick force signal. Thus, with this specie, when the pilot moves his stick he commands a lateral velocity. The pilot, therefore is required to integrate (mentally) only the craft lateral velocity to derive a signal representing the lateral distance that the craft has moved. This signal, as before, in the form of a force is then subtracted from the force applied to the control stick.

While a system which automatically provides and compares a signal representing the time integral of lateral velocity, i.e. lateral distance covered, with a signal representing the force applied to the craft control stick has not been discussed, it is well within the purview of the invention. In such a system, the pilot would command a lateral position when he moves his control stick. This type system, however, has the limitation that some means for bringing the craft within a close range of the landing area would be required. This is because situations could arise wherein the stick, even though it had been moved the full extent of its travel, could only direct the craft to a position short of the position desired.

A principal object of the invention is to provide landing control apparatus for VTOL tailsitter aircraft;

Another object of the invention is to provide apparatus for controlling the flight of a tailsitter VTOL craft through its stall angle of attack;

Another object of the invention is to provide apparatus for controlling the lateral position over the earth of a VTOL craft while the craft is in hovering flight.

The invention will be described with reference to the drawings of which:

FIG. 4 is a block diagram of a circuit which, when substituted for a circuit in FIG. 1, provides another embodiment of the invention; and FIG. 5 is another block diagram which may be substituted for a circuit in FIG. 1 to provide a different embodiment of the invention.

Figure 1:
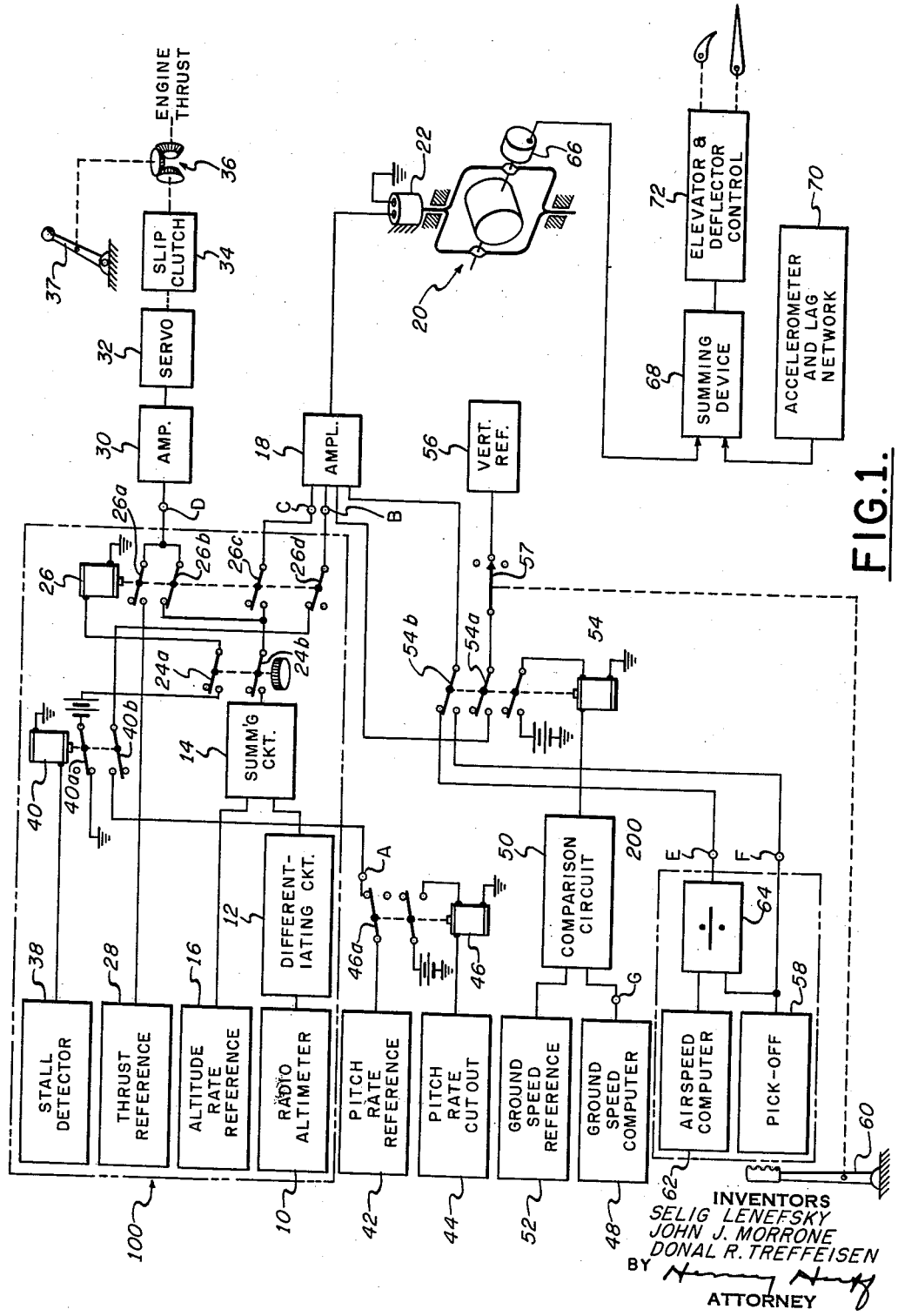
FIG. 1 is a block diagram of one form of the invention.

Referring to FIG. 1, a radio altimeter 10 produces a signal representing the instantaneous altitude of the craft. This signal is applied to a differentiating circuit 12 which produces a signal representing the craft rate of descent, the descent rate signal then being applied to a summing circuit 14. A signal representing a reference rate of descent is also applied to the summing circuit 14 and is provided by an altitude rate reference 16 which may be a simple potentiometer. The signal provided by the reference 16 is such that it has a sense opposite to that of the differentiating circuit 12 output signal when the craft descends at the reference rate. Therefore, when the actual and reference descent rates are equal, the summing circuit 14 does not produce an altitude rate error signal. Any signal which is produced by the summing circuit 14, however, is applied through switching (the description of which will follow) to an amplifier 18.

The amplifier 18 output signal is then used to precess the spin axis of a two degree of freedom gyro 20 which provides the craft with a variable attitude reference as earlier described. A torquer 22, mounted on the gyro 20, precesses the gyro spin axis about an axis parallel to the craft pitch axis in proportion to signals applied to it by the amplifier 18 by applying, in accordance with well-known gyroscope principles, a torque which tries to rotate the gyro spin axis about an axis parallel to the craft yaw axis. For clarity, only one torquer is shown in FIG. 1, since the present invention is concerned primarily with the pitch attitude of the craft.

A pair of manually operated switches 24a and 24b, which are simultaneously closed by the pilot when he wants to land his craft, operate to energize a relay 26. When the relay 26 is energized, the switches 26a, 26b, 26c and 26d all move to their lower positions. With the switch 26a in its lower position, a signal representing a predetermined low thrust level is applied from a thrust reference 28, which may be a simple potentiometer, to an amplifier 30. The amplifier 30 then applies its output signal to a servo 32 which drives, through a slip clutch 34 and differential gearing 36, the thrust varying means of the craft. The craft throttle control 37 is also connected to the craft thrust varying means through the gearing 36.

A stall detector 38, preferably similar to one of the stall detectors disclosed in U.S. Patent 2,891,742, issued in the name of D. R. Treffeisen et al., and assigned to the assignee of the present invention (see elements 69 and 70), produces a signal when the actual angle of attack of the craft is at or near the craft stall angle of attack. The stall detector 38 output signal is then applied to a relay 40 which, when energized, opens a switch 40a and closes a switch 40b. When the switch 40a opens, the relay 26 becomes deenergized, thereby releasing the switches 26a, 26b, 26c and 26d, to their upper positions. With the switch 26b in its upper position, any altitude rate error signal appearing at the output of the summing circuit 14 is applied to the amplifier 30 so that altitude rate can be commanded through the craft thrust control system after the craft stall angle of attack is reached. When the switch 40b closes, a pitch rate reference 42

(which also may be a simple potentiometer that can be preset by the pilot or in accordance with the design of the craft) applies a signal representing a commanded pitch-up rate to the amplifier 18. When the craft has a pitch attitude slightly greater than ninety degrees, e.g., 93 degrees, a pitch rate cutout device 44 produces a signal which is applied to a self-holding relay 46 which removes the pitch rate reference 42 signal from the amplifier 18 by opening the switch 46a. The pitch rate cutout 44, which may be a simple pendulum or a pick-off on a gyro horizon, energizes the relay 46 at pitch attitudes greater than ninety degrees to provide braking for the craft, i.e. reducing the craft ground speed to zero, by means of the craft thrust. This will be described more fully later.

As the craft goes through the landing maneuver, its ground speed is decreased by decreasing the craft thrust, by changing the direction of the craft thrust from a parallel relationship with the earth, and by braking the craft with the craft thrust. A ground speed computer 48 providing a signal representing the craft ground speed applies this signal to a comparison circuit 50 together with a signal representing some low ground speed reference (usually zero feet per second), the latter signal being derived from a ground speed reference device 52. In practice, the signals provided by the ground speed computer 48 and radio altimeter 10 both may be provided by a single device such as pulsed doppler radar. The comparison circuit 50 produces an output signal whenever the actual ground speed of the craft equals the reference ground speed. A typical comparison circuit useable in this manner is shown and described in the Massachusetts Institute of Technology Radiation Laboratory Series, vol. 19, page 343, FIGS. 9–20, McGraw Hill Publishing Company, Inc., 1949. When the comparison circuit 50 produces an output signal, it applies that signal to a self-holding relay 54 which remains energized after the comparison circuit output signal is removed, thereby holding switches 54a and 54b in their lower positions. When the switch 54a moves to its lower position, signals, if any, representing long term departures of the craft longitudinal axis from a vertical relationship with the earth are applied from a vertical reference 56, e.g. a damped pendulum, to the amplifier 18. Since there is a three degree departure of the craft longitudinal axis from the earth vertical at this time, the gyro 20 spin axis (and therefore the craft longitudinal axis) is precessed to a vertical relationship with the earth to cancel the reference 56 output signal.

Prior to initiating the landing maneuver, signals derived from the craft control stick are applied to the torquer 22 and the pilot, in effect, "flies" the reference when he moves his stick. The craft then follows up on the reference as was mentioned earlier. In conventional pitch control systems, i.e. systems in which the control stick directly controls the deflection of the craft elevators, the amount that the control stick must be deflected to effect a given craft pitch rate varies inversely with the speed of the craft. Hence, for naturalness of feel, it is important to have the reference "fly" in response to control stick commands exactly the way an airplane would fly. A control stick pick-off 58, responsive to the application of force to the control stick 60, produces a signal proportional to that force. This signal and a signal derived from the craft air speed computer 62 are applied to a divider circuit 64 which produces a signal proportional to the ratio of the control stick force to the craft air speed. Usually, the air speed signal is limited to some value greater than zero to prevent division by zero during hover. The divider 64 output signal is then applied through the switch 54b to the amplifier 18 when the switch 54b is in its upper position, i.e. prior to slowing down to the reference ground speed. Once the switch 54b moves to its lower position, i.e. when the craft slows down to the reference ground speed, the control stick pick-off 58 signals are applied directly to the amplifier 18. Also, whenever a force is applied to the craft control stick, a normally closed spring loaded switch 57 is opened to remove the vertical reference signal from the amplifier 18. Therefore, in the final phase of the landing maneuver, the control stick alone controls the attitude of the reference 20.

Figure 2:
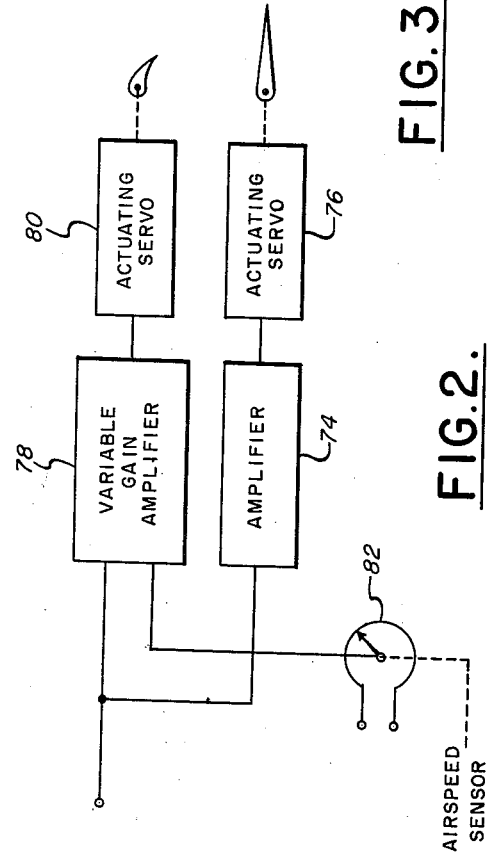
FIG. 2 is a block diagram of an elevator and thrust control useable with the invention.

When there is an angular displacement between the gyro spin axis and the craft longitudinal axis, e.g. when the spin axis is being precessed away from the craft longitudinal axis, a pick-off 66 responds to produce a signal proportional to such displacement. The pick-off 66 output signal is algebraically summed in a summing device 68 with a signal which is proportional to the angular acceleration of the craft about the craft pitch axis. This last-mentioned signal is produced by an accelerometer and lag network 70 and serves not only to damp the response of the craft to the displacement signal but to anticipate short term departures of the craft from the attitude defined by the spin axis. The output signal from the summing device 68 is applied to a thrust deflector and elevator control 72 which is shown in detail in FIG. 2. The thrust deflector and elevator control 72 has two channels, one for the control of the craft elevators and one for the control of the craft thrust deflector. The elevator control channel comprises an amplifier 74 and a servo 76 which responds to the output signals from the amplifier 74 to operate the elevators. The thrust deflector channel comprises a variable gain amplifier 78 and a servo 80 which operates to vary the direction of the craft thrust in accordance with the amplifier 78 output signals. The air speed computer 62 connects to and drives the wiper of a potentiometer 82 in proportion to the air speed of the craft. The potentiometer 82 output signal is applied to the variable gain amplifier 78 and operates to bias the amplifier 82 so that, as the craft speed decreases, the output of the amplifier 78, and therefore the effect of the thrust deflector channel, is gradually increased from zero.

Figures 3A, 3B, 3C:
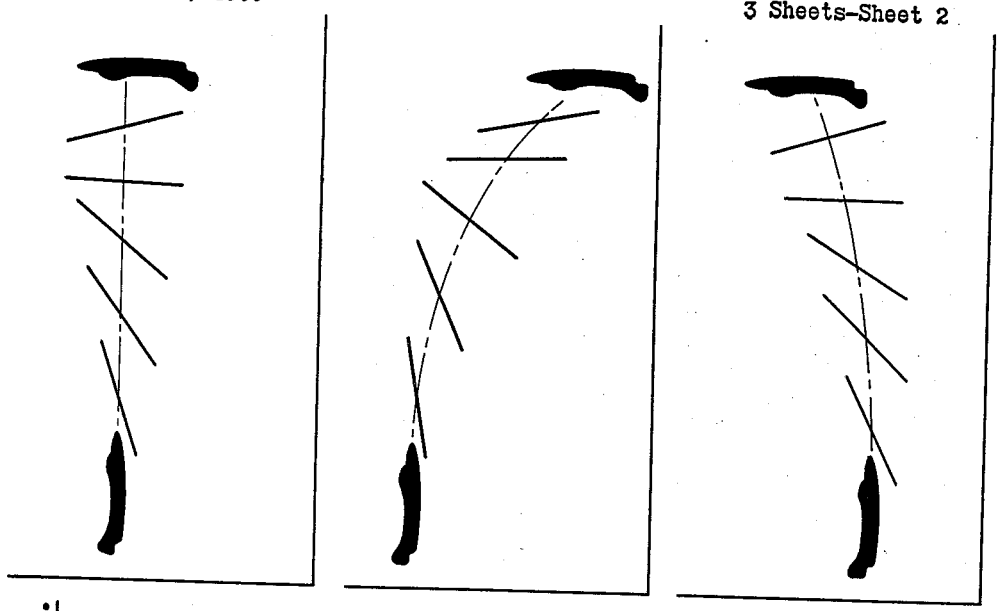
FIGS. 3a, 3b and 3c, are diagrams showing typical landing maneuvers made possible by the present invention.

In operation, the pilot moves the switches 24a and 24b to their lower positions when he wants to land his craft, thereby energizing the relay 26 and moving the switches 26a, 26b, 26c and 26d to their lower positions. This causes a low thrust level signal to be applied through the switch 26a to the engine thrust control loop and through the time lags of the throttle control system reduces the craft thrust. With the craft thrust decreased, the speed decreases and therefore the craft lift starts to decrease, thereby causing the craft rate of descent to increase. When the craft descent rate falls below the reference descent rate, a signal is produced by the summing circuit 14 which passes through the switches 24b and 26c to the amplifier 18 to precess the gyro 20 and thereby cause the craft to increase its angle of attack, i.e. rate of descent control is maintained through pitch angle. As the craft angle of attack increases, so does the craft lift; therefore, the craft is able to hold the reference descent rate even though the craft thrust had been decreased. With the craft reference descent rate equal to zero feet per second the craft will hold substantially the altitude at which the landing maneuver was started and will therefore have a landing maneuver profile similar to that shown in FIG. 3a. If, however, the craft reference descent rate is greater or less than zero feet per second, the craft will have landing maneuver profiles similar to those respectively shown in FIGS. 3b and 3c. In either of these latter cases, means (not shown) must be provided to command a zero descent rate when the craft goes below, or climbs above, a predetermined altitude, or when the ground speed decreases to zero. This is so that the craft will neither crash into the ground at the greater-than-zero reference descent rate or zoom to a high altitude at the less-than-zero reference descent rate.

When the actual angle of attack of the craft equals and exceeds the craft stall angle of attack, the gyro 20 is no longer precessed by altitude rate error signals from the summing circuit 14 but, instead, is precessed by a signal from the pitch rate reference 42. Also, at this time, the craft maintains the reference rate of descent by applying the altitude rate error signal from the summing circuit 14 to the amplifier 30 in the engine thrust control loop. Since the craft engine thrust cannot be varied instantly in response to signals applied to the amplifier 30, there is a momentary increase in the actual descent rate over the reference descent rate, thereby causing slight loss in altitude as the craft is precessed through its stall angle of attack. However, this is not a problem if the landing maneuver is begun at a high enough altitude.

As the craft pitches up in response to signals applied to the amplifier 18 from the pitch rate reference 42, it eventually acquires a pitch attitude greater than ninety degrees, thereby directing its resultant thrust in the direction that it is moving. Directing the craft thrust in the direction that the craft moves, operates to brake the craft and, when the craft ground speed reaches zero, the gyro 20 spin axis is precessed back up to a true vertical relationship with the earth by slaving it to the long term vertical reference 56.

With the craft longitudinal axis perpendicular to the earth and the craft ground speed zero, the craft may have its lateral position relative to the earth varied by tipping the craft resultant thrust vector (as earlier described) by applying signals from the pick-off 58 to the amplifier 18. Then with the craft hovering over the landing area, the craft is lowered to the earth by retarding carefully the throttle control 37 to reduce the craft thrust-to-weight ratio to some value below one. When, however, the throttle control 37 is released, it immediately advances to the position it had before it was retarded and the craft holds velocity.

By substituting the circuit shown in FIG. 4 for the circuit 100 of FIG. 1, an embodiment of the invention may be obtained which prevents the craft from losing altitude while precessing through the craft stall angle of attack. In FIG. 4, circuit elements 10, 12, 14 and 16 operate exactly as they did in FIG. 1 and are shown only for clearness of description. A manually operated switch 24, which is closed by the pilot when he wants to land his craft, operates to energize a relay 126. When the relay 126 is energized, the switches 126a and 126b both move to their upper positions. As a result, a signal produced by the thrust reference 28', which represents a low thrust level, appears at terminal D and an altitude rate error signal (if any) appears at terminal C. The thrust reference 28' may be a simple potentiometer. When error signals appear on terminal C, the craft pitches up (as described earlier), thereby causing the craft to approach its stall angle of attack. Just prior to reaching the craft stall angle of attack, a stall detector 38', which may be similar to the stall detector 38, but which must be set to respond at an angle of attack slightly less than the stall angle of attack, produces an output signal which energizes a relay 140. When the relay 140 is energized, it closes a switch 140a. This applies a signal produced by a thrust reference 141 and representing a high thrust level (usually about 80 percent of the craft weight) to the terminal D. At the same time that the high thrust level signal is applied to the terminal D, it is also applied to relays 142, 144 and 150 through a delay device 146. When the relays 142, 144 and 150 become energized, they respectively open switches 142a and 144a, and move a switch 150a to its lower position. Therefore, when the craft throttle control 37 is advanced by the application of a high thrust level signal to terminal D, the craft rate of descent is still controlled by the signal appearing on terminal C, i.e. by precessing the gyro spin axis. However, after the lagging thrust builds up, the rate of descent control signals are removed from the terminal C and applied to the terminal D through the operation of the relay 142 (which deenergizes the relay 126 by opening the switch 142a) and through the operation of the relay 150 (which moves the switch 150a to its lower position). The time delay provided by the delay device 146 is set so that the level of the engine thrust, which is increasing in response to the output signal from the thrust reference 141, will exactly equal the thrust level commanded by the summing circuit 14 when the switch 150a moves to its lower position. In this way altitude will be neither gained nor lost while precessing through the stall angle of attack.

With the circuit of FIG. 5 substituted for the circuit 200 of FIG. 1, three different lateral positioning control techniques for the hovering craft are possible. A summing circuit 202 which produces a signal representing the difference between its input signals has the pick-off 58 output signal applied to it. A three position switch 204 also applies to the summing circuit 202 a signal representing the angular departure (in pitch) of the craft longitudinal axis from a perpendicular relationship with the earth or a signal representing the craft ground speed (depending respectively on whether the switch 204 is in position 1 or 3). The signal representing the angular departure of the craft longitudinal axis from an earth vertical may be provided by a gyro horizon; the ground speed signal may be provided by the ground speed computer 48. When the switch is in position 2, nothing is connected to the summing circuit 202. Hence, with the switch 204 in position 2, the circuit of FIG. 5 is essentially the same as the circuit 200 of FIG. 1 and the pilot in changing his lateral position must perform two double integrations mentally as earlier described. With the switch 204 in position 1, the pilot commands an angular orientation and lateral acceleration of the craft when he moves his control stick; therefore, the pilot must only doubly integrate mentally the craft lateral acceleration in moving the craft to a desired position. With the switch 204 in position 3, the pilot commands a lateral velocity for his craft when he moves his control stick; such control stick manipulation causes the craft thrust vector to change direction and produce a craft ground speed signal which, when algebraically added to the pick-off signal, cancels that signal. With this form of lateral positioning control, the pilot must only integrate mentally the craft velocity in bringing the craft to a desired position. It is to be noted that the above-described lateral positioning control techniques are not only applicable with tailsitter VTOL craft, but are equally applicable to VTOL craft that land with their longitudinal axes substantially horizontal to the earth. However, with such craft, the gyro horizon must provide a signal representing the angular position of the craft longitudinal axis relative to the horizon. Then the summing circuit 202 output signal could be used to control the lateral positioning of this type VTOL craft. The throttle-pitch control interplay may also be used in landing this type VTOL craft. For example, the throttle may be retarded and the craft rate of descent controlled through pitch commands. At that time, the nozzles would be rapidly swung forward to stop the craft's forward movement. Then, the rate of descent would be commanded through the throttle control loop.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for controlling the pitch attitude of vertical take-off and landing aircraft during a landing maneuver, said maneuver being one which is initiated when the craft is flying substantially horizontal to the earth, said craft being of the type that lands with its longitudinal axis substantially perpendicular to the earth comprising means for varying the pitch of said craft, means for varying the magnitude of the craft thrust, means operable with said thrust and pitch varying means responsive when a landing is to be effected to reduce said thrust and, at substantially the same time, to increase gradually the craft pitch, and means operable with said thrust varying means responsive at a predetermined craft pitch attitude to increase the craft thrust to a value approximately equal to the craft weight.

2. Apparatus for controlling the pitch attitude of a vertical take-off and landing aircraft during a landing maneuver, said maneuver being one which is initiated when the craft is flying substantially horizontal to the earth, said craft being of the type that lands with its longitudinal axis perpendicular to the earth comprising throttle means, means for commanding a pitch rate for said craft, means for commanding a rate of descent for said craft, means responsive when a landing is to be effected to retard said throttle means to a predetermined value, and, at substantially the same time, command said craft descent rate, and means responsive at a predetermined pitch attitude to command said pitch rate and advance said throttle means to a value approximately equal to the craft weight.

3. Apparatus for controlling during a landing maneuver the pitch attitude of a vertical take-off and landing aircraft of the type that lands with its longitudinal axis perpendicular to the earth, said landing maneuver being one which is initiated when the craft is flying substantially horizontal to the earth, comprising thrust controlling means, pitch controlling means, means operable with said thrust and pitch controlling means responsive when a landing is to be effected to decrease the craft thrust and increase the craft pitch so as to maintain a predetermined craft descent rate, means responsive at approximately the craft stall angle of attack to increase the craft thrust, and means responsive when the craft pitch is substantially ninety degrees to cease increasing the craft pitch.

4. Apparatus for controlling during a landing maneuver the pitch attitude of a vertical take-off and landing aircraft of the type which takes off and lands with its longitudinal axis perpendicular to the earth, said landing maneuver being one which is initiated when the craft is flying substantially horizontal to the earth, comprising means defining a vertical to the earth, means for commanding a predetermined craft rate of descent, means for varying the attitude of the craft longitudinal axis, means responsive when said landing is to be made to reduce the thrust of said craft and, at substantially the same time, command said predetermined descent rate, and means responsive at a predetermined pitch attitude to activate said means for varying the attitude of the craft longitudinal axis and thereby align the craft longitudinal axis substantially parallel to the defined vertical, and means responsive when the craft has a predetermined angle of attack to increase the craft thrust to a value approximately equal to the craft weight.

5. Apparatus for controlling the pitch attitude of a vertical take-off and landing aircraft during a landing maneuver, said maneuver being one which is initiated when the craft is flying substantially horizontal to the earth, said craft being of the type which takes off and lands with its longitudinal axis perpendicular to the earth comprising means providing a signal representing a constant rate of descent, means providing a signal representing a craft pitch attitude of ninety degrees, means for varying the thrust of said craft, means for moving the control surfaces of said craft, means for moving the craft thrust deflector, means responsive when a landing is to be made to reduce the thrust of said craft to a predetermined value and at substantially the same time, apply said rate of descent signal to said means for moving the control surfaces of said craft to hold the descent rate, and means responsive at approximately the stall angle of attack of said craft to apply the pitch attitude signal to said means for moving the thrust deflector of said craft to adjust the craft pitch attitude accordingly, said last mentioned responsive means also applying at substantially the same time the rate of descent signal to said means for varying the craft thrust to hold the descent rate.

6. Apparatus for controlling the pitch attitude of a vertical take-off and landing aircraft during a landing maneuver, said maneuver being one which is initiated when the craft is flying substantially horizontal to the earth, said craft being of the type that lands with its longitudinal axis perpendicular to the ground, comprising means for varying the thrust of said craft, means for moving the elevators of said craft, means for moving the thrust deflector of said craft, means responsive when a landing is to be effected to reduce the thrust of said craft to a predetermined level with said thrust varying means, and at substantially the same time, move the craft elevators with said elevator moving means to increase the craft pitch and thereby maintain the descent rate constant, and means responsive at approximately the craft stall angle of attack to increase the craft thrust with said thrust varying means and move the craft thrust deflector with said deflector moving means to maintain respectively the descent rate constant and the pitching up operation until said craft longitudinal axis is substantially perpendicular to the earth.

7. Apparatus for controlling during a landing maneuver the pitch attitude of a vertical take-off and landing aircraft of the type that lands with its longitudinal axis perpendicular to the earth, said landing maneuver being one which is initiated when the craft is flying substantially horizontal to the earth, comprising thrust controlling means, pitch controlling means, means operable with said thrust and pitch controlling means responsive when a landing is to be effected to decrease the craft thrust and increase the craft pitch so as to maintain a predetermined craft descent rate, means responsive in anticipation of the craft angle of attack to increase the craft thrust, and means responsive when the craft pitch is substantially ninety degrees to cease increasing the craft pitch.

8. Apparatus for controlling the pitch attitude of a vertical take-off and landing aircraft during a landing maneuver, said maneuver being one which is initiated when the craft is flying substantially horizontal to the earth, said craft being of the type that takes off and lands with its fore-and-aft axis perpendicular to the earth comprising means producing a signal representing a commanded craft rate of descent, means producing a signal representing a craft pitch attitude of approximately ninety degrees, means responsive when a landing is to be effected to retard the throttle of said craft to a predetermined value, and at substantially the same time, drive the elevators of said craft with said commanded rate of descent signal to effect the commanded rate of descent, and means responsive at substantially the stall angle of attack to drive the throttle of said craft with said rate of descent signal and drive the thrust deflector with said craft pitch attitude signal to effect said pitch attitude.

9. Apparatus for controlling the pitch attitude during a landing maneuver of a vertical take-off and landing aircraft of the type that lands with its longitudinal axis perpendicular to the ground, said landing maneuver being one which is initiated when the craft is flying substantially horizontal to the earth, comprising means operable to move the control surfaces of said craft, means operable to move the craft thrust deflector, means operable to vary the thrust of said craft, means responsive when a landing is to be made to decrease the craft thrust with said thrust varying means and at substantially the same time gradually increase the craft pitch with said control surface moving means so as to keep the descent rate constant, means responsive prior to reaching the craft stall angle of attack to increase the craft thrust with said thrust varying means so as to keep said descent rate constant after the stall angle of attack is reached and, at substantially the same time, move the craft thrust deflectors to keep the craft pitching up until a pitch attitude of ninety degrees is reached.

10. Apparatus for controlling the pitch attitude during a landing maneuver of a vertical take-off and landing aircraft of the type that lands with its fore-and-aft axis perpendicular to the earth, said landing maneuver being one which is initiated when the craft is flying substantially horizontal to the earth, comprising means producing a signal representing a commanded craft descent rate, means producing a signal representing a pitch attitude of ninety degrees, means for moving the elevators of said craft, means for moving the thrust deflector of said craft, means for varying the thrust of said craft, means responsive when a landing is to be effected to reduce the craft thrust with said thrust varying means and apply said descent rate signal to said means for moving the craft elevators to maintain the descent rate constant by gradually increasing the craft pitch, and means responsive when said stall angle of attack is anticipated to apply said descent rate signal to said thrust varying means and thereby maintain said descent rate constant, said last mentioned responsive means also applying at substantially the same time that said stall angle of attack is anticipated the pitch rate signal to said thrust deflector moving means to move said thrust deflector and thereby sustain the pitching-up of the craft until the craft fore-and-aft axis is substantially perpendicular to the earth.

11. Apparatus for controlling the pitch attitude during a landing of maneuver of a vertical take-off and landing aircraft of the type that lands with its fore-and-aft axis perpendicular to the earth, said landing maneuver being one which is initiated when the craft is flying substantially horizontal to the earth, comprising means producing a signal representing a commanded craft descent rate of zero feet per second, means producing a signal representing a pitch attitude of ninety degrees, means for moving the elevators of said craft, means for moving the thrust deflector of said craft, means for varying the thrust of said craft, means responsive when a landing is to be effected to reduce the craft thrust with said thrust varying means and apply said descent rate signal to said means for moving the craft elevators to maintain the descent rate constant by gradually increasing the craft pitch, means responsive when said stall angle of attack is anticipated to apply said descent rate signal to said thrust varying means and thereby maintain said descent rate constant, said last mentioned responsive means also applying when said stall angle of attack is anticipated the pitch rate signal to said thrust deflector moving means to move said thrust deflector and thereby sustain the pitching-up of the craft until the craft fore-and-aft axis is substantially perpendicular to the earth, and means for controlling the lateral positioning of the craft over the earth after said craft fore-and-aft axis is made substantially perpendicular to the earth comprising pick-off means producing a signal representing the displacement of the craft control stick, means producing a signal representing the angular displacement between the craft longitudinal axis and a vertical to the earth, and normally receiving said last-named signal but receiving said control stick pick-off signal when said control stick is operated, the output signal from said last-named means being applied to said craft thrust deflector moving means to move said thrust deflector and thereby tip said craft from a substantially perpendicular relationship with the earth and cause lateral movement of the craft relative to the earth.

12. Apparatus for controlling the pitch attitude during a landing maneuver of a vertical take-off and landing aircraft of the type that lands with its fore-and-aft axis perpendicular to the earth, said landing maneuver being one which is initiated when the craft is flying substantially horizontal to the earth, comprising means producing a signal representing a zero commanded craft descent rate, means producing a signal representing a pitch attitude of ninety degrees, means for moving the elevators of said craft, means for moving the thrust deflector of said craft, means for varying the thrust of said craft, means responsive when a landing is to be effected to reduce the craft thrust with said thrust varying means and apply said descent rate signal to said means for moving the craft elevators to maintain the descent rate constant by gradually increasing the craft pitch, means responsive when said stall angle of attack is anticipated to apply said descent rate signal to said thrust varying means and thereby maintain said descent rate constant, said last mentioned responsive means also applying when said stall angle of attack is anticipated the pitch rate signal to said thrust deflector moving means to move said thrust deflector and thereby sustain the pitching-up of the craft until the craft fore-and-aft axis is substantially perpendicular to the earth, and means for controlling the lateral positioning of the craft over the earth after said craft fore-and-aft axis is substantially perpendicular to the earth comprising pick-off means producing a signal representing the displacement of the craft control stick, means producing a signal representing the craft ground speed and summing means receiving both said signals and producing a signal representing their algebraic sum, said sum signal being applied to said craft thrust deflector moving means to move said thrust deflector and thereby tip said craft from a substantially perpendicular relationship with the earth and cause the craft to move laterally over the earth.

13. Apparatus for controlling the lateral positioning over the earth of a hovering vertical take-off and landing aircraft having a vertical gyroscope comprising means for varying the direction of the craft resultant thrust vector, pick-off means operable with the control stick of said craft to produce a signal representing the displacement of the stick, means independent of said vertical gyroscope producing a signal representing the ground speed of said craft, and summing means receiving both said signals and producing a signal representing their algebraic sum, said sum signal being applied to said thrust direction varying means to vary the resultant thrust direction in proportion to said sum signal.

References Cited in the file of this patent

UNITED STATES PATENTS

| | | |
|---|---|---|
| 2,875,965 | Anderson et al. | Mar. 3, 1959 |
| 2,959,378 | Eggers | Nov. 8, 1960 |

FOREIGN PATENTS

| | | |
|---|---|---|
| 677,752 | Great Britain | Aug. 20, 1952 |